United States Patent
Porter et al.

(10) Patent No.: US 6,637,537 B2
(45) Date of Patent: Oct. 28, 2003

(54) DUAL STACK EXHAUST SYSTEM

(76) Inventors: Carl Porter, 1432 North St., Samaria, MI (US) 48177; Morley Oerther, 8840 Todd Rd., Ida, MI (US) 48140

( * ) Notice: Subject to any disclaimer, the term of this patent is extended or adjusted under 35 U.S.C. 154(b) by 0 days.

(21) Appl. No.: 10/082,609

(22) Filed: Feb. 25, 2002

(65) Prior Publication Data

US 2002/0117346 A1 Aug. 29, 2002

Related U.S. Application Data

(60) Provisional application No. 60/270,807, filed on Feb. 23, 2001.

(51) Int. Cl.$^7$ .............................. B60K 13/04; F01N 7/10
(52) U.S. Cl. ...................... 180/309; 180/89.2; 181/228; 285/253
(58) Field of Search ................................ 180/309, 89.2; 181/231, 227, 228; 285/253, 903, 420, 226, 49; 296/37.6

(56) References Cited

U.S. PATENT DOCUMENTS

| | | | |
|---|---|---|---|
| D214,037 S | 5/1969 | Flugger | D14/6 |
| 3,685,615 A | 8/1972 | Rutt | 181/35 R |
| 3,695,708 A | 10/1972 | Vincenty | 298/1 H |
| D228,753 S | 10/1973 | Kryssing | D14/6 D |
| 3,827,523 A * | 8/1974 | Williams | 180/309 |
| 3,907,057 A * | 9/1975 | Reddekopp | 180/309 |
| D248,463 S | 7/1978 | Barnes | D12/194 |
| 4,192,143 A * | 3/1980 | Hilegele | 285/253 |
| D255,112 S | 5/1980 | Alexander | D12/194 |
| 4,378,945 A * | 4/1983 | Trautman | 180/309 |
| 4,408,675 A | 10/1983 | Keller | 180/296 |
| D271,963 S | 12/1983 | Perkins | D12/194 |
| 4,475,264 A | 10/1984 | Schultz | 15/300 A |
| D289,766 S | 5/1987 | Evans | D15/5 |
| D291,576 S | 8/1987 | Wilkinson | D15/5 |
| 4,753,619 A * | 6/1988 | Sullivan | 285/253 |
| 4,760,894 A | 8/1988 | Harwood et al. | 181/282 |
| 4,907,666 A * | 3/1990 | Tecco | 180/309 |
| D318,840 S | 8/1991 | Miles, Jr. | D12/194 |
| 5,388,408 A | 2/1995 | Lawrence | 60/324 |
| D368,247 S | 3/1996 | Jones | D12/194 |
| 5,797,656 A | 8/1998 | Kauk et al. | 298/1 H |
| 5,988,308 A * | 11/1999 | Qutub | 180/309 |
| 6,102,446 A * | 8/2000 | Thomas | 285/253 |
| 6,116,659 A * | 9/2000 | Wagner | 285/253 |
| 6,415,603 B1 * | 7/2002 | Nowka et al. | 285/253 |
| 6,488,313 B1 * | 12/2002 | Thomas | 285/253 |

* cited by examiner

*Primary Examiner*—Brian L. Johnson
*Assistant Examiner*—Jeffrey Restifo
(74) *Attorney, Agent, or Firm*—Gifford, Krass, Groh, Sprinkle, Anderson & Citkowski, P.C.

(57) ABSTRACT

A pickup truck and exhaust system combination is designed for a pickup truck having a cab and a bed extending rearwardly therefrom. The bed has a load floor bounded by a front wall adjacent the cab and a pair of side walls. The bed has an opening defined therein. The truck has an engine and an exhaust pipe extending rearwardly under the cab to an outlet end. A flexible exhaust coupler has a first end in fluid communication with the outlet end of the exhaust pipe and a second end in fluid communication with the first end. A hollow elongated collector is disposed on the floor of the truck bed adjacent the front wall. The collector has a first end and an opposed second end with the midportion therebetween. The collector also has an inlet defined in the midportion, with the inlet being connected to the second end of the coupler through the opening in the bed. The collector also has a first outlet defined in the first end and a second outlet defined in the second end, with the outlets being in fluid communication with the inlet. First and second tubular exhaust stacks have lower ends connected to the first and second outlets and extend generally vertically upwardly therefrom to open upper ends.

21 Claims, 4 Drawing Sheets

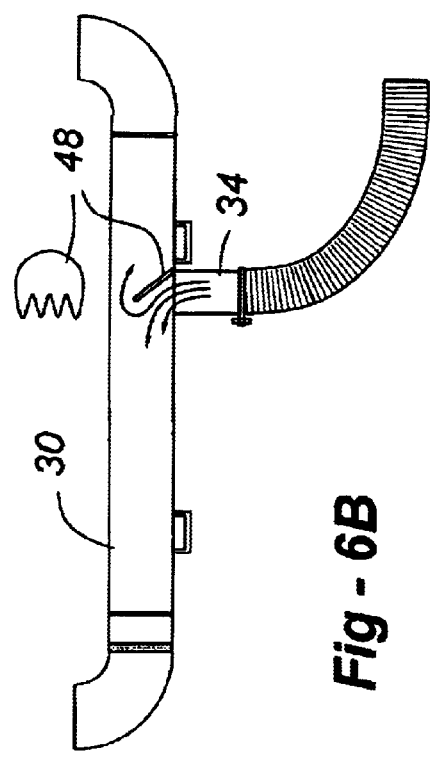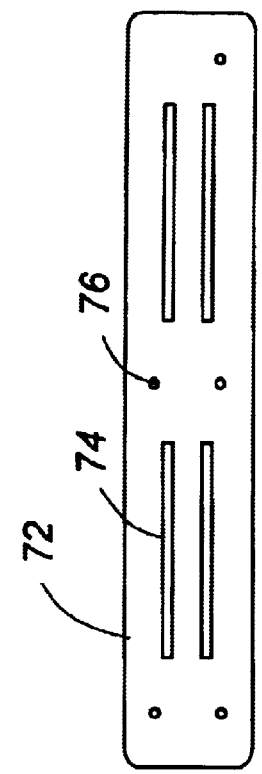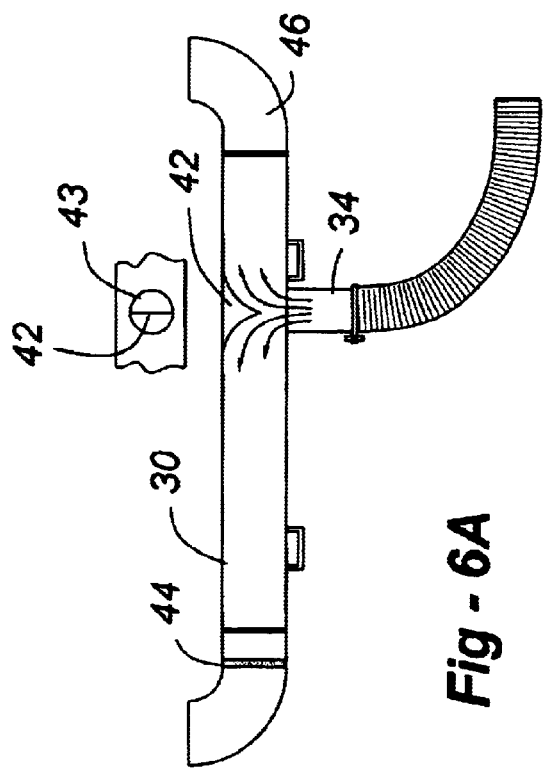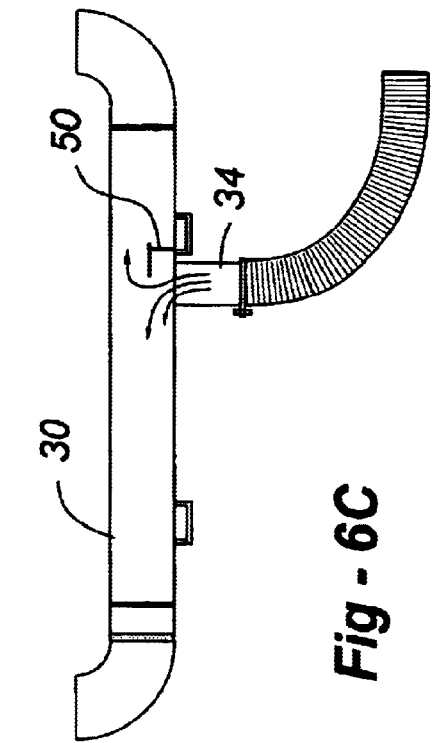
Fig - 6A
Fig - 6B
Fig - 6C
Fig - 8

DUAL STACK EXHAUST SYSTEM

REFERENCE TO RELATED APPLICATION

This application claims priority from U.S. provisional patent application Serial No. 60/270,807, filed Feb. 23, 2001, the entire contents of which being incorporated herein by reference.

FIELD OF THE INVENTION

The present invention relates generally to exhaust systems for vehicles and, more specifically, to a system for a pick-up truck that provides a pair of vertical exhaust stacks.

BACKGROUND OF THE INVENTION

Generally speaking, an exhaust system of a vehicle routes exhaust gases from the exhaust ports of the vehicle's engine to a position remote from the engine. The exhaust system typically includes an exhaust manifold connected to the exhaust ports of the engine, a catalytic converter or other pollution control device, a muffler or other sound control device, and tubing interconnecting the manifold, catalytic converter, and muffler. In most passenger vehicles, the exhaust system extends from a front mounted engine underneath the vehicle. The exhaust system has a rear-most portion, often referred to as the tailpipe, that exits near the rear of the vehicle. The exhaust system may consist of a single or dual pipes for a portion of, or the entire length, of the exhaust system. Some commercial vehicles have exhaust systems that extend upwardly from the vehicle along one or both sides of the vehicle and terminate in an upper end near or above the top of the vehicle. These upwardly extending exhaust pipes are sometimes referred to as exhaust stacks. Many owners of pickup trucks like the looks of upwardly extending exhaust stacks. However, providing upwardly extending exhaust stacks on a passenger vehicle is typically costly and complicated.

SUMMARY OF THE INVENTION

The present invention provides a dual stack exhaust system for a pickup truck that may be provided as a part of a truck or as a conversion system. The system is designed for use with a pickup truck of the type having a cab and a bed extending rearwardly from the cab. The bed has a load floor that is bounded by a front wall adjacent a cab and a pair of side walls. The bed may have an opening defined therein, such as in the load floor. The truck has an engine and an exhaust pipe extending rearwardly under the cab to an outlet end. An exhaust coupler has one end in fluid communication with the outlet end of the exhaust pipe and a second end in fluid communication with the first end. A hollow elongated collector is disposed on the floor of the truck bed adjacent the front wall. The collector has a first end and an opposed end with the midportion therebetween. The collector has an outlet defined in the midportion, with the inlet connected to the second end of the coupler through the opening of the bed such that exhaust flowing from the second end of the coupler flows into the collector. The collector also has a first outlet defined in the first end and a second outlet defined in the second end, with the outlets being in fluid communication with the inlet, such that exhaust flowing into the inlet flows out of the outlets. A first tubular exhaust stack has a lower end connected to the first outlet and extends generally vertically upwardly therefrom to an open upper end such that exhaust introduced into the lower end flows out of the upper end. A second tubular exhaust stack has a lower end connected to the second outlet and extends vertically upwardly therefrom to an open upper end such that exhaust introduced into the lower end flows out of the upper end.

BRIEF DESCRIPTION OF THE DRAWINGS

FIG. 6A is a cross-sectional rear view of the collector portion of the exhaust system according to the present invention showing a first preferred embodiment of an exhaust diverter disposed in the collector;

FIG. 6B is a cross-sectional view similar to FIG. 6A showing an alternative embodiment of a diverter;

FIG. 6C is a cross-sectional view similar to FIGS. 6A and 6B showing a further alternative embodiment of the diverter;

FIG. 8 is a plan view of a secondary heat shield for use with the present invention.

DETAILED DESCRIPTION OF THE PREFERRED EMBODIMENTS

Figure 1:
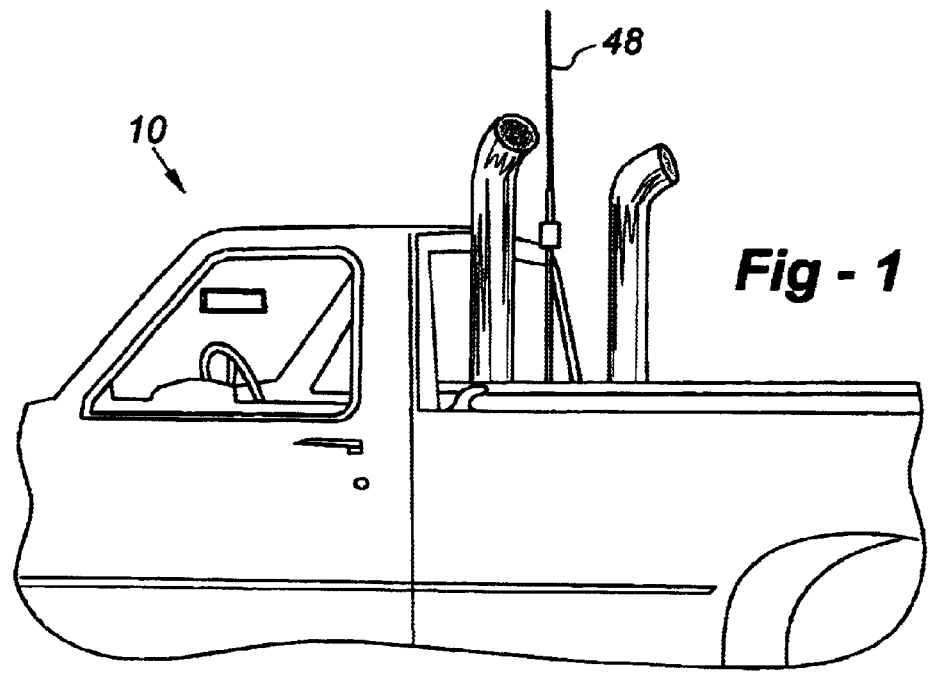
FIG. 1 is a perspective view showing a portion of a pickup truck with a dual stack exhaust system according to the present invention installed in the bed.
Figure 2:
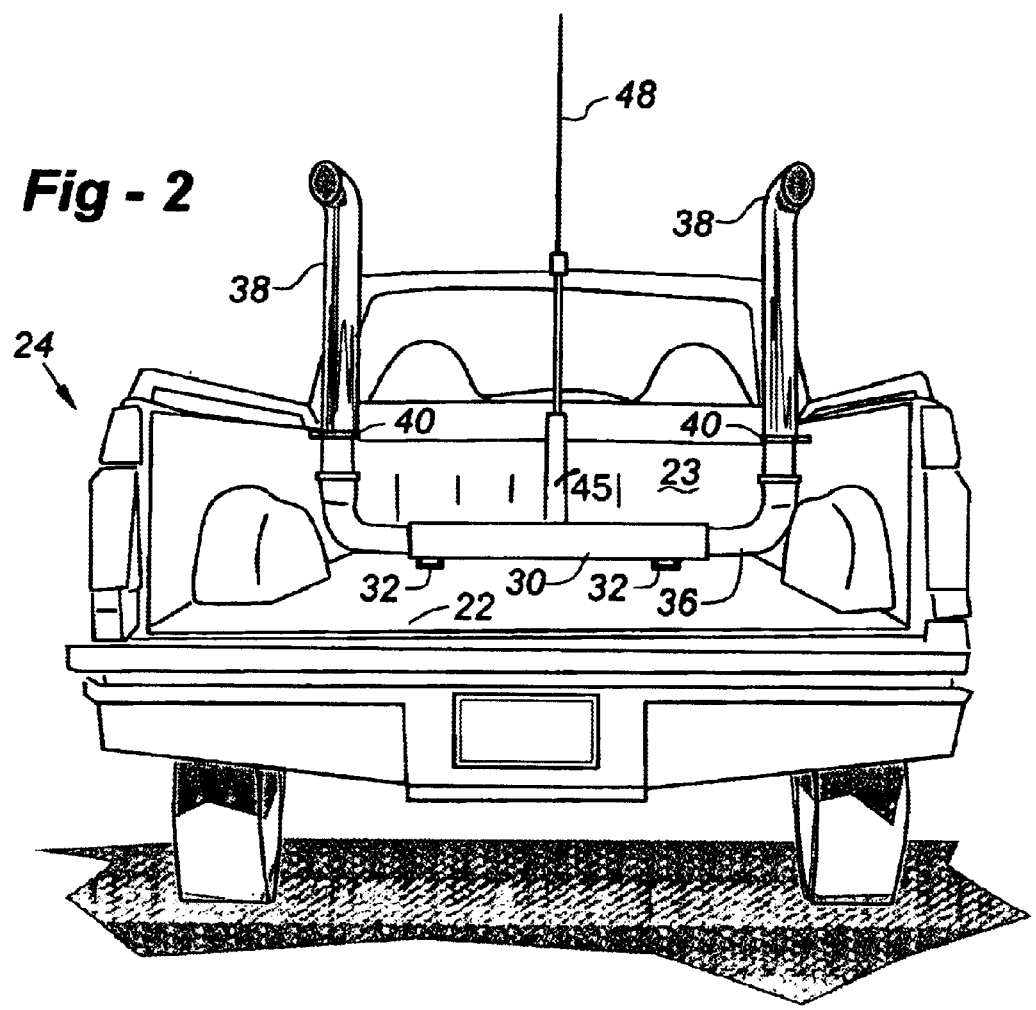
FIG. 2 is a rear elevational view of the truck and exhaust system of FIG. 1.
Figure 4:
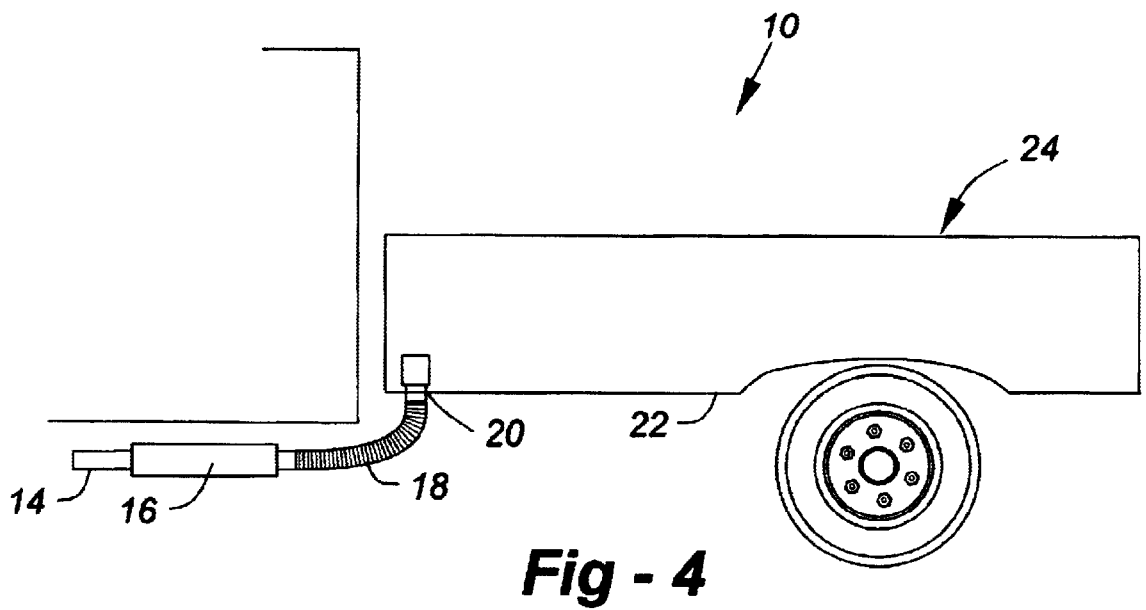
FIG. 4 is a side elevational schematic of a portion of a pickup truck cab and bed showing the exhaust routing from the existing exhaust system to the collector of the present invention.

The present invention provides a dual stack exhaust system for use with a pickup truck. This system is simple and inexpensive, while still providing the desired looks of a dual stack exhaust system. FIGS. 1 and 2 show two views of a pickup truck with a dual stack exhaust system according to the present invention installed therein. As shown, a pair of exhaust stacks extend upwardly out of the bed of the pickup truck, giving the desired look of a dual stack exhaust system. FIG. 4 is a cross-sectional side view showing the exhaust routing. The truck 10 has an engine (not shown) with an exhaust pipe 14 extending from the engine to a catalytic converter 16. In an unmodified truck, an exhaust system extends rearwardly from the outlet of the catalytic converter 16 and includes a muffler and a tailpipe. The entire system is disposed below the underside of the truck 10. However, in the present invention, exhaust coupler 18 has one end connected to the outlet of the catalytic converter and extends upwardly through a hole 20 in the load floor 22 of the bed 24 of the truck 10.

Figure 5:
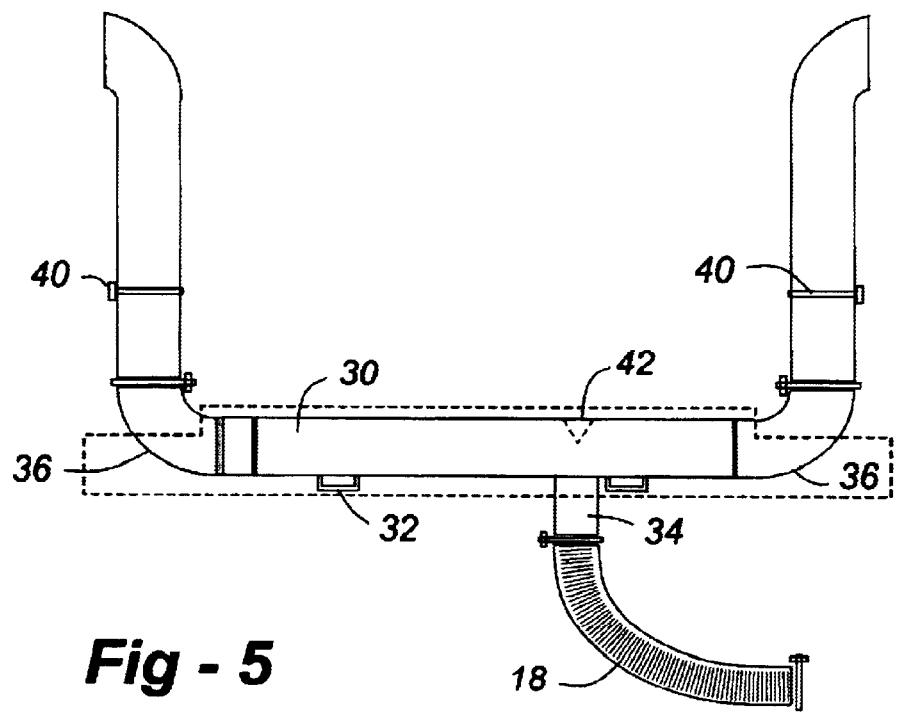
FIG. 5 is a rear elevational view of the assembled components of an exhaust system according to the present invention.

Referring now to FIG. 5, the various components of the present invention will be described in more detail. A collector 30 is designed to mount to the floor of the truck bed adjacent the front wall of the truck bed using mounting brackets 32. The collector is shown mounted in the bed of a truck in FIG. 2. In one embodiment of the present invention, designed for use with a diesel engine truck, the collector 30 is a five inch by five inch piece of square tubing. However, as will be clear to those of skill in the art, the collector 30 may instead be a round pipe, or may include internal baffles and sound absorbers so as to function as a muffler. In a diesel truck application, connecting the exhaust coupler 18 directly to the outlet of the catalytic converter provides sufficient noise reduction to be used without any additional muffler element. An inlet 34 is provided in the underside of the collector 30. The exhaust coupler 18 connects to the inlet 34 for routing exhaust gases into the hollow interior of the collector 30. A single hole has been cut in the floor of the truck bed for allowing the exhaust coupler 18 and inlet 34 to pass therethrough.

The collector 30 has openings 44 and 46 at each of its ends and is arranged transversely in the truck bed so that the ends are pointed towards the sides of the truck bed. Each end of the collector 30 preferably has a square-to-round adapter and a 90 degree elbow 36 attached thereto. In one embodiment, the elbows are five-inch elbows. A chrome stack 38 is connected to the outlet end of each of the elbows 36. The stacks 38 extend upwardly and turn outwardly and rearwardly as may best be seen in FIGS. 1 and 2. In one embodiment, the stacks 38 are chromed and five inches in diameter. They may also be stainless steel. Mounting brackets 40 are provided on each of the stacks for mounting the stacks to the sides of the truck bed.

The exhaust coupler 18 is preferably of flex coupling. This allows for easy installation and also isolates the existing exhaust system of the vehicle from the collector 30. This allows for relative movement between the two portions. Alternatively or additionally, the collector 30 may be mounted to the bed 22 using flexible mounts to somewhat isolate the collector 30 from the bed 22. Likewise, the exhaust stack mounting brackets 40 may be flexible mounts to allow some isolation. As shown in FIG. 5, the inlet 34 is preferably a pipe that extends downwardly from one wall of the collector 30. In some embodiments, the inlet 34 has a three-inch, three and a half inch or four-inch diameter and a length of nine inches, and the exhaust coupler 18 is sized to fit over the inlet 34. As will be clear to those of skill in the art, the size of the coupler and the inlet are preferably chosen to match the diameter of the existing exhaust system of the truck.

As an alternative to the embodiment illustrated in FIGS. 1, 2 and 5, the collector 30 may instead be mounted to the front wall 23 of the bed, either adjacent the floor 22 or spaced therefrom. An opening may then be provided in the front wall 23 with the exhaust being routed through this opening. By spacing the collector 30 away from the floor 22, additional floor space may be freed up.

Returning again to FIG. 5, it can be seen that the inlet 34 of the collector 30 is closer to the right-hand end of the collector rather than to the left-hand end. Obviously, the positioning of the inlet depends on the application, positioning of the exhaust system of the vehicle, the location of the hole through the bed, and other factors. However, when the inlet is positioned closer to one end than the other, a diverter 42 is preferable provided to help balance the flows of the two exhaust stacks 38 and/or divert the flow towards the outlets. Preferably, approximately equal amounts of exhaust flow out of each of the stacks to provide an optimal appearance and sound.

FIGS. 6A–6C show various designs for an exhaust diverter for use with the present invention. FIG. 6A shows the preferred diverter 42. As shown, the diverter 42 is a pointed protrusion extending from the wall of the collector 30 opposite the inlet 34. The protrusion 42 may be formed from a piece of angle iron with straight side walls, or may have sloped sides 43, such as shown. As exhaust flow comes out of the inlet 34, it strikes the diverter 42, causing the flow to split between the two outlets, 44 and 46 of the collector 30. FIG. 6B shows an alternative diverter 48. It should be noted that FIGS. 6A and 6B both include small detailed views of the diverters 42 and 48. As shown, the diverter 48 is a flap extending upwardly from the bottom of the converter 30 inside the square tubing by the inlet 34. The flap 48 is angled towards the end of the collector further from the inlet 34. As shown, the diverter 48 may be a flap with fingers and the shape as illustrated. This shape may be easily formed by cutting the flap from the bottom of the collector 30 prior to attaching the inlet 34 and bending the flap upwardly to form the diverter 48. Obviously, the diverter may be of other sizes, shapes and configurations or may be omitted in certain applications. For example, FIG. 6C shows an alternative configuration of a diverter 50. In each of FIGS. 6A–6C, exhaust gas flows are shown by arrows A and B. By altering the configuration of the diverters 42, 48 or 50, or other configurations, the exhaust flow through the stacks may be balanced.

As will be clear to those of skill in the art, the configuration of the exhaust system shown in FIG. 5 may be altered in various ways. For example, the sizes of the various pipes may be changed to alter the flow resistance, sound characteristics, and look of the system. Also, the pipes may be changed between square, round and other cross-sections. The exhaust coupler 18 is preferable a piece of flexible exhaust pipe to allow some movement between the portions of the exhaust system mounted in the bed of the truck and the existing exhaust system underneath the truck. This may instead be a solid piece of pipe, or other types of flexible joints may be provided. Experimentation has indicated that the configuration illustrated works well with turbo-diesel trucks. In these applications, the combination of the turbocharger and the catalytic converter give some sound reduction such that no muffling element is required in the exhaust system after the catalytic converter. Also, experimentation has indicated that the square tubing gives a pleasing sound. In other applications some muffling may be required. As previously mentioned, the collector 30 may be provided with sound absorption or baffles, such as by providing a pipe within a pipe configuration. Alternatively, or in addition thereto, a muffler may be provided between the catalytic converter and the connector pipe, in the exhaust coupler, in the elbows, or in the stacks. For example, chromed or stainless steel mufflers may be used as a portion of the stacks 38. Also, it is not necessary that the stacks be chromed or stainless steel. Instead, they may be painted or powder-coated or have other appearances. It is preferred that the collector and elbows be painted or powder-coated or formed out of a stainless steel or chromed material. The stacks 38, as illustrated, are just one possible configuration. Alternatively, the stack may be shorter, or taller, or be angled at their tops, curved in a different way or include flappers such as used on some commercial vehicles.

Figure 7:
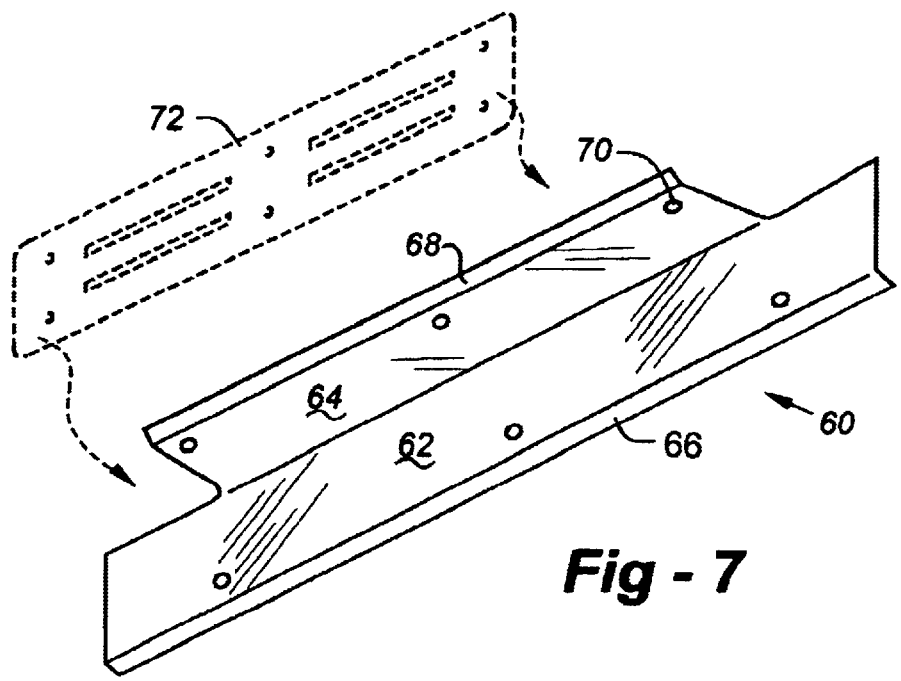
FIG. 7 is a perspective view of a heat shield for use with the present invention.
Figure 3:
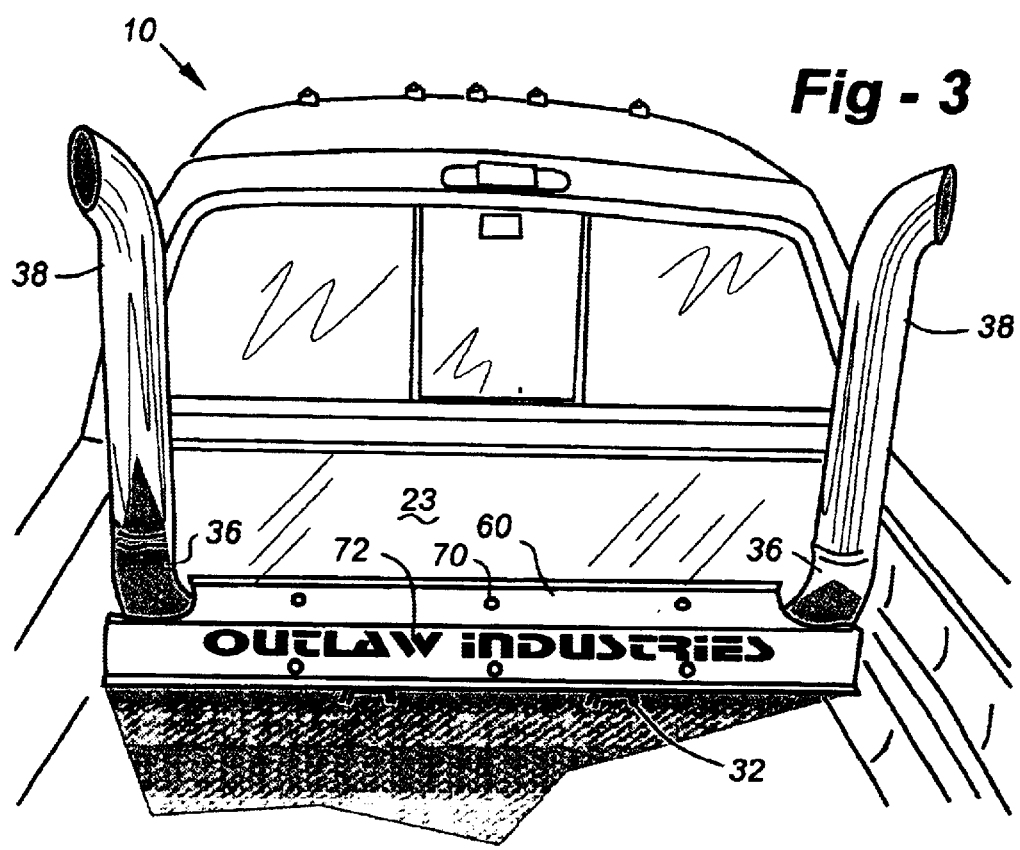
FIG. 3 is a rear perspective view of a portion of a truck with an exhaust system according to the present invention installed in the bed, further showing a heat shield installed in place over the collector portion of the exhaust system.

Referring again to FIG. 2, various options are available with the exhaust system. For example, an antenna mount 45 is shown connected to the top side of the collector 30 with an antenna 48 mounted to the top of the mount 45. This is also shown in FIG. 1. The collector 30 may be provided with mounting holes for an antenna mount, or provided with the mount itself. Also, as best shown in FIG. 2, the collector 30 and the elbows 36 are positioned in the bed of the truck in a position such that they may be contacted by materials in the bed. In turbo-diesel applications, it has been found that the collector 30 generally remains cool enough that no additional protection is necessary. However, it may be desirable to provide a heat shield to cover some or all of the collector 30 and/or elbows 36. Alternatively, the pipes may be wrapped in insulation or otherwise insulated. FIGS. 3 and 7 show various views of a guard for use with the exhaust system according to the present invention. FIG. 7 is an isometric view of the guard 60. As will be clear to those with skill in the art, the guard 60 may be mounted around the collector 30, either by mounting it directly to the collector or connecting it to the bed or a bracket adjacent to the collector. Vent holes may also be provided. A space between the guard 60 and the collector 30 keeps the guard 60 cooler thereby preventing damage to objects which contact the guard. As shown, the guard 60 preferably is an angled piece of metal designed to fit around the collector, as shown in FIG. 3. The guard 60 has a rear portion 62 and a top portion 64 that are preferably positioned at approximately 90 degree to one another. The top portion 64 fits above the top of the collector, while the rear portion 62 fits over the rear of the collector. As shown, the top portion 64 is preferably sized such that it extends most of the distance between the elbows 36, thereby covering a portion of the elbows 36 and the top of the collector. The rear portion 62 is longer than the top portion 64 and extends almost to the side walls of the truck bed. The rear face 62 preferably has a lower edge 66 that bends outwardly to help prevent materials from falling onto the collector. Likewise, the top portion 64 preferably has an upturned rear edge 68 to help prevent materials from getting behind the collector. As shown, the guard 60 preferably has a plurality of holes 70 therethrough. Fasteners, not shown, pass through these openings 70 and engage the collector for positioning the guard 60 in a spaced-apart relationship with the collector. As shown in FIG. 3, the guard 60 may include cut out portions 72 which acts as vents for further cooling. The cut out 72 may be shaped so as to form words or logos. FIG. 8 shows an alternative front heat guard 72. This heat guard 72 is designed to connect to the front face of the collector so if material falls between the front wall 23 of the bed and the collector, the guard keeps it away from the collector. FIG. 7 shows an example position of the guard 72. As with the guard 60, the guard 72 preferably has vents 74 and openings 76 for receiving fasteners.

To install an exhaust system according to the present invention, the installer preferably removes the existing exhaust system rearwardly of the catalytic converter of the vehicle. A hole is then cut in the floor of the truck bed in a position appropriate for lining up with the inlet of the collector. The collector is then mounted with the inlet extending downwardly either into or through the hole in the floor of the bed. The exhaust coupler is interconnected between the rear of the catalytic converter and the inlet on the collector. The elbows and stacks are then mounted to the collector and the side brackets are used to mount the stacks to the side of the bed. As another alternative, braces may be provided such that the stacks are braced to the collector or to other portions of the system or the truck bed, to avoid the necessity of holding the stacks to the sides of the bed. As another alternative, the existing exhaust system may be left mostly intact underneath the vehicle so as to allow the vehicle to be converted back to its original configuration. As yet another alternative, the collector and stack portion of the exhaust system according to the present invention may be mounted in the bed of the truck without connecting the system to the exhaust system of the vehicle. In this way, the cosmetic appearance of stacks is provided, though the system remains non-functional.

While the present invention has been illustrated as having a single inlet to the collector 30, other alternatives are also possible. For example, two inlets may be provided for connection to two exhaust pipe underneath the truck. This would be especially suitable to dual exhaust systems. In this case, both inlets may feed into the same common collector, or the collector may be divided into two sections with a complete divider, or may be entirely separately formed and not interconnected. Alternatively, a partial connection may be provided. Additional inlets may be further provided, as needed.

Those with skill in the art will appreciate that the preferred embodiment of the present invention may be altered in various ways without departing from the scope or teaching of the present invention.

We claim:

1. In combination:
    a pickup truck having a cab and a bed extending rearwardly therefrom, the bed having a load floor bounded by a front wall adjacent the cab and a pair of side walls, the bed having an opening defined therein, the truck having an engine and an exhaust pipe extending rearwardly under the cab to an outlet end;
    a flexible exhaust coupler having a first end in fluid communication with the outlet end of the exhaust pipe and a second end in fluid communication with the first end;
    a hollow elongated collector disposed on the floor of the truck bed adjacent the front wall, the collector having a first end and an opposed second end with a midportion therebetween, the collector having an inlet defined in the midportion, the inlet being connected to the second end of the coupler through the opening in the bed such that exhaust flowing from the second end of the coupler flows into the collector, the collector further having a first outlet defined in the first end and a second outlet defined in the second end, with the outlets being in fluid communication with the inlet such that exhaust flowing into the inlet flows out of the outlets;
    a first tubular exhaust stack having a lower end connected to the first outlet, the first exhaust stack extending generally vertically upwardly therefrom to an open upper end such that exhaust introduced into the lower end flows out of the upper end; and
    a second tubular exhaust stack having a lower end connected to the second outlet, the second exhaust stack extending generally vertically upwardly therefrom to an open upper end such that exhaust introduced into the lower end flows out of the upper end.

2. The combination according to claim 1, wherein the opening is defined in the floor of the bed.

3. The combination according to claim 2, wherein the inlet of the collector comprises an inlet tube extending through the opening in the floor of the bed.

4. The combination according to claim 1, wherein the collector is disposed on the floor in a transverse position such that the opposed ends are each directed toward one of the side walls of the bed.

5. The combination according to claim 1, wherein each of the tubular exhaust stacks comprises an elbow portion connected to the collector and a straight portion extending upwardly from the elbow portion.

6. The combination according to claim 1, wherein the collector comprises a tube with a square cross section, the inlet being defined in one side of the square cross section.

7. The combination according to claim 6, wherein the collector further comprises a diverter for diverting exhaust entering the inlet toward the outlets, the diverter comprising a protrusion extending from the inside of the collector opposite the inlet.

8. The combination according to claim 1, further comprising a heat shield covering the collector, the shield comprising a cover spaced from the collector.

9. The combination according to claim 1, wherein the collector further comprises a muffler disposed therein for muffling exhaust noise.

10. A dual exhaust stack conversion system for a pickup truck having a cab portion and a bed extending rearwardly from the cab, the bed having a load floor bounded by a front wall and a pair of side walls, the truck further having a front mounted engine and an exhaust pipe running rearwardly under the floor of the bed, the conversion system comprising:

an elongated manifold having a pair of opposed ends and a side wall extending therebetween, an inlet being defined in the side wall and an outlet being defined in each of the opposed ends, the manifold having an installed position wherein the manifold is disposed on the floor of the bed adjacent the front wall with the inlet directed toward the floor and the outlets directed toward the side walls;

an exhaust coupler having an inlet and an outlet, the coupler having an installed position wherein the inlet is connected to the exhaust pipe and the outlet is connected to the inlet of the manifold through an opening in the floor of the bed; and a pair of elongated generally tubular exhaust stacks each having an inlet end and an outlet end, the stacks having an installed position wherein the inlet ends are each connected to one of the outlets of the manifold and the stacks extend upwardly away from the floor;

wherein when the manifold, coupler and stacks are in the installed positions, the conversion system provides a pair of upwardly extending exhaust stacks in communication with the exhaust pipe of the truck.

11. The system according to claim 10, wherein the inlet of the collector comprises an inlet tube which, in the installed position, extends through the opening in the floor of the bed.

12. The system according to claim 10, wherein each of the tubular exhaust stacks comprises an elbow portion which, in the installed position, is connected to the collector, and a straight portion extending from the elbow portion.

13. The system according to claim 10, wherein the collector comprises a tube with a square cross section, the inlet being defined in one side of the square cross section.

14. The system according to claim 13, wherein the collector further comprises a diverter for diverting exhaust entering the inlet toward the outlets, the diverter comprising a protrusion extending from the inside of the collector opposite the inlet.

15. The system according to claim 10, further comprising a heat shield covering the collector, the shield comprising a cover spaced from the collector.

16. The system according to claim 10, wherein the collector further comprises a muffler disposed therein for muffling exhaust noise.

17. In combination:

a pickup truck having a cab and a bed extending rearwardly therefrom, the bed having a load floor bounded by a front wall adjacent the cab and a pair of side walls, the bed having an opening defined therein, the truck having an engine and an exhaust pipe extending rearwardly under the cab to an outlet end;

a collector disposed in the truck bed, the collector having an inlet and a pair of outlets, with both of the outlets being in fluid communication with the inlet;

a exhaust coupler having a first end in fluid communication with the outlet end of the exhaust pipe and a second end in fluid communication with the inlet of the collector through the opening in the bed of the truck;

a pair of generally vertical exhaust stacks each having first ends in fluid communication with one of the outlets of the collector, the stacks extending upwardly to open second ends.

18. The combination according to claim 17, wherein opening is defined in the load floor adjacent the front wall, and the collector is disposed adjacent the front wall with the inlet aligned with the opening, the coupler and collector inlet being connected through the opening.

19. The combination according to claim 17, further comprising a heat shield covering the collector, the heat shield comprising a cover spaced from the collector.

20. A dual exhaust stack conversion system for a pickup truck having a cab portion and a bed extending rearwardly from the cab, the bed having a load floor bounded by a front wall and a pair of side walls, the truck further having a front mounted engine and an exhaust pipe running rearwardly under the floor of the bed, the conversion system comprising:

a manifold disposed in the truck bed, the manifold having an inlet and a pair of outlets, with both of the outlets being in fluid communication with the inlet, the manifold having an installed position wherein the manifold is disposed in the bed;

an exhaust coupler having an inlet and an outlet, the coupler having an installed position wherein the inlet is connected to the exhaust pipe and the outlet is connected to the inlet of the manifold through an opening in the bed; and a pair of elongated generally tubular exhaust stacks each having an inlet end and an outlet end, the stacks having an installed position wherein the inlet ends are each connected to one of the outlets of the manifold and the stacks extend upwardly away from the floor;

wherein when the manifold, coupler and stacks are in the installed positions, the conversion system provides a pair of upwardly extending exhaust stacks in communication with the exhaust pipe of the truck.

21. The system according to claim 20, wherein the opening in the bed is defined in the load floor adjacent the front wall, and the manifold is disposed adjacent the front wall with the inlet aligned with the opening when the manifold is in the installed position.

* * * * *